US010255011B2

(12) United States Patent
Arockiasamy et al.

(10) Patent No.: US 10,255,011 B2
(45) Date of Patent: Apr. 9, 2019

(54) METHODS AND SYSTEMS FOR APPLYING SPOT COLOR ON ONE OR MORE PAGES AS SPECIFIED BY A USER

(71) Applicant: XEROX CORPORATION, Norwalk, CT (US)

(72) Inventors: Franklin Arul Raj Arockiasamy, Chennai (IN); Rahul Raj, Jamtara (IN); Chiranjib Basu, Kolkata (IN)

(73) Assignee: Xerox Corporation, Norwalk, CT (US)

( * ) Notice: Subject to any disclaimer, the term of this patent is extended or adjusted under 35 U.S.C. 154(b) by 23 days.

(21) Appl. No.: 15/455,275

(22) Filed: Mar. 10, 2017

(65) Prior Publication Data
US 2018/0260176 A1  Sep. 13, 2018

(51) Int. Cl.
*G06F 3/12* (2006.01)
*H04N 1/60* (2006.01)
*H04N 1/387* (2006.01)
*H04N 1/54* (2006.01)

(52) U.S. Cl.
CPC .......... *G06F 3/1258* (2013.01); *G06F 3/1205* (2013.01); *G06F 3/1242* (2013.01); *H04N 1/6008* (2013.01); *G06F 3/125* (2013.01); *G06F 3/1208* (2013.01); *G06F 3/1248* (2013.01); *G06F 2206/1514* (2013.01); *H04N 1/387* (2013.01); *H04N 1/54* (2013.01); *H04N 2201/0094* (2013.01)

(58) Field of Classification Search
CPC .................................................. G03G 15/6585
See application file for complete search history.

(56) References Cited

U.S. PATENT DOCUMENTS

| 7,480,070 B2 | 1/2009 | Falk |
| 7,839,540 B2 | 11/2010 | Nishide et al. |
| 8,605,323 B2 | 12/2013 | Gaash et al. |
| 2010/0007902 A1* | 1/2010 | Kikuchi ............... G06F 3/1204 358/1.9 |
| 2016/0241744 A1* | 8/2016 | Xu ......................... H04N 1/54 |

* cited by examiner

*Primary Examiner* — King Y Poon
*Assistant Examiner* — Michael Burleson

(57) ABSTRACT

The disclosure discloses methods and systems for selectively applying clear colorant on one or more pages of a print job. The method includes receiving a print job including a document having a plurality of pages. Then, clear colorant attributes are received from a user via a user interface, the clear colorant attributes include type of clear colorant and one or more pages where clear is to be applied. An imposition template is received from the user via the user interface. The print job is decomposed into image data. The plurality of pages is re-arranged, based on the imposition template. The re-arranged pages are stored. Thereafter, clear colorant on the one or more pages as specified by the user is applied. The pages as specified by the user with clear colorant feature are printed and the remaining pages are printed in a normal printing mode.

17 Claims, 8 Drawing Sheets

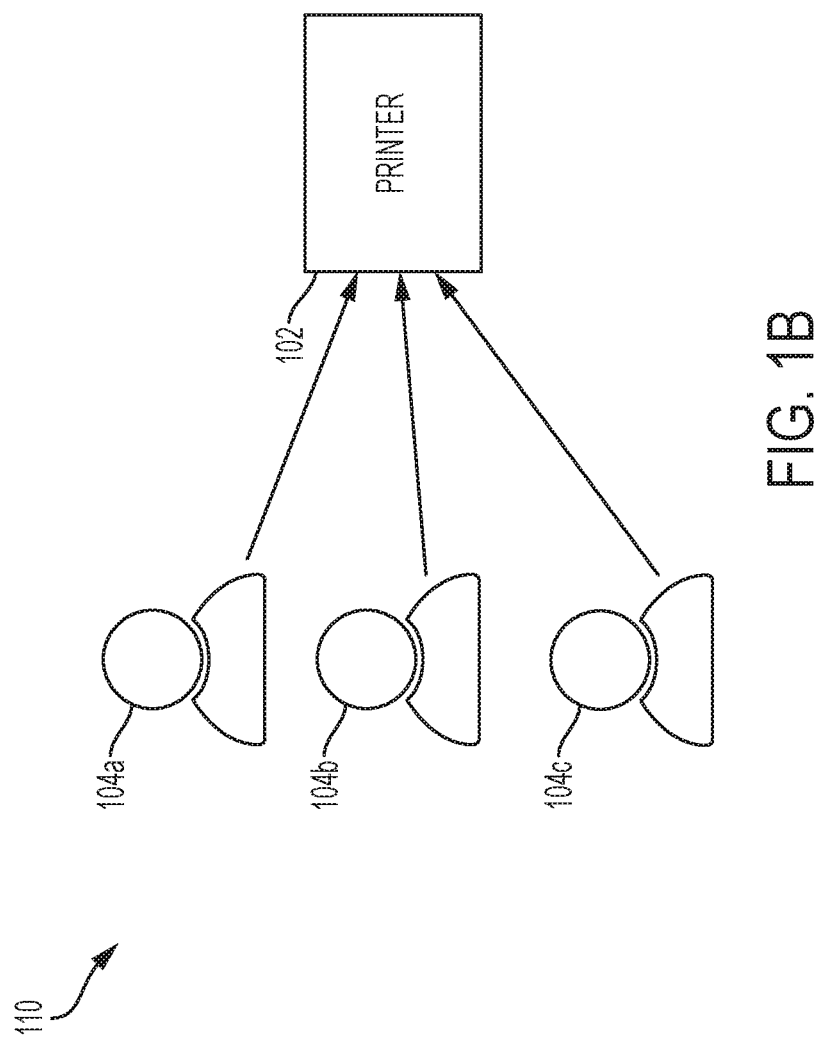

Conventional Approach

Conventional Approach

METHODS AND SYSTEMS FOR APPLYING SPOT COLOR ON ONE OR MORE PAGES AS SPECIFIED BY A USER

TECHNICAL FIELD

The presently disclosed embodiments relate to printing technologies in general, and particularly to, methods and systems for applying spot color on one or more pages as specified by a user.

BACKGROUND

Printing industry has evolved a lot, making it possible to print beautiful and visually appealing documents with a plurality of graphic and color printing options. One of such options include a shiny or glossy finish to text, graphics or any other types of objects in printed pages. This can be achieved by the use of a special type of colorant called the clear colorant (also known as spot color), which provides sheen to any types of object, be it text or a graphic. The clear colorant may be contained in an ink station in a printer or a Multi-Function Device (MFD). If a user wants to use the clear colorant on a particular page, he or she can do this by the use of exception page programming. However, if the user selects the option of applying clear colorant on a particular page at the job level, the clear colorant gets applied to all the pages of the print job. Similar challenges are being faced by users when documents are in imposition.

Imposition is a technique to arrange multiple pages on a single sheet. In other words, imposition is a smart way of arranging multiple pages on a single sheet. Imposition may be done manually, but it becomes complicated when it comes to multipage documents such as books or manuals. In such cases, it is better to take help from printers to make efficient use of sheets and to ensure that pages are in correct sequence. If there is a booklet say of 8 pages and the user wishes to fit the 8 pages on 2 sheets. The user further specifies how many rows or columns he user wishes to have on the single sheet.

Assuming that the user specifies 2 rows and 2 columns and in such cases, 4 images fit onto the first sheet, while the remaining 4 fit onto a second sheet. Here each page on the single sheet is referred to as a logical page. Now, if the user tries to apply clear colorant on one of the imposed pages at the time of printing (i.e., at job level), the clear colorant gets applied to all pages (i.e., logical pages). Thus, the existing process of applying clear colorant is not adaptive to the need of the user and there can be requirements, where the user wishes to apply clear colorant on specific page/logical page. Therefore, there is a need for methods and systems for enabling users to apply clear colorant on specific pages in imposition.

SUMMARY

The disclosure discloses a printer. The printer includes a receiving module, a user interface, a decomposer, an imposition engine, a buffer manager and a print engine. The receiving module is configured for receiving a print job, the print job includes a document having a plurality of pages, each page is associated with a page number. The user interface is configured for: receiving clear colorant attributes from a user, the clear colorant attributes include type of clear colorant and one or more page numbers corresponding to one or more pages, where clear is to be applied; receiving an imposition type to be applied on the document, from the user. The decomposer is configured for: receiving the clear colorant attributes and the imposition type; decomposing the plurality of pages into image data; and creating a job ticket for processing the print job having the plurality of pages, by other modules. The imposition engine is configured for re-arranging the image data corresponding to the plurality of pages, based on the imposition type. The buffer manager is configured for storing the re-arranged image data corresponding to the plurality of pages. The print engine is configured for: selectively, applying clear colorant on image data corresponding to the one or more pages as specified by the user; and printing the image data corresponding to the one or more pages as specified by the user with clear colorant.

A method is disclosed. The method includes receiving a print job, the print job includes a document having a plurality of pages. Then, clear colorant attributes are received from a user via a user interface, wherein the clear colorant attributes include type of clear colorant and one or more pages where clear is to be applied. An imposition template is received from the user via the user interface. The print job is decomposed into image data. A job ticket is created for processing the print job. The plurality of pages is re-arranged, based on the imposition template. The re-arranged pages are stored. Thereafter, clear colorant on the one or more pages as specified by the user is applied. Finally, the one or more pages as specified by the user are printed with clear colorant feature and the remaining pages are printed in a normal printing mode.

A method for selectively applying clear colorant on one or more pages of a print job is disclosed. The method includes receiving the print job, wherein the print job includes a document having a plurality of pages. Then, clear colorant attributes are received from a user at a job level, wherein the clear colorant attributes include type of clear colorant and one or more pages where clear is to be applied. An imposition type from the user is received. The print job is decomposed into a print ready format. A job ticket is created for processing the print job. Based on the imposition type, the plurality of pages is re-arranged. The re-arranging includes: determining the number of pages to be arranged on a single sheet of an output media; arranging two or more logical pages to be printed on the single sheet of the output media, wherein each logical page is assigned with a logical page identifier; and associating each logical page with original page of the print job. The re-arranged plurality of pages is stored. Then, clear colorant is applied on one or more logical pages corresponding to the one or more pages as specified by the user. Finally, the one or more logical pages corresponding to the one or more pages as specified by the user are printed with a clear colorant feature and the remaining pages are printed with normal CMYK (Cyan, Magenta, Yellow and Key) mode.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 1A-1B illustrate exemplary environments in which various embodiments of the disclosure can be practiced.

DESCRIPTION

Figure 1A:
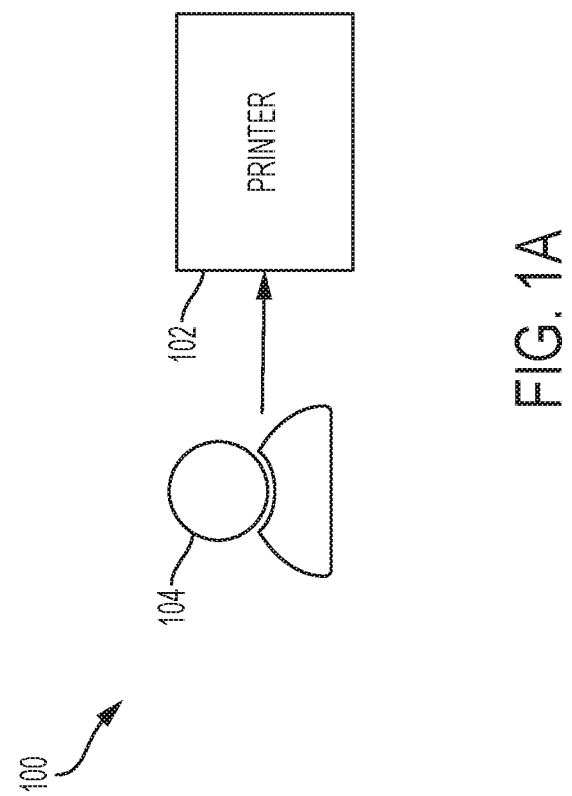

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

The term "multi-function device" (MFD) refers to a device or a combination of multiple devices configured to perform one or more functions, but not limited to, scanning, printing, copying, imaging, and so forth. The multi-function device includes software, hardware, firmware, or combination thereof. The multi-function device is considered as a printer without any limitation or may interchangeably be used with the phrase printer. The printer includes a number of components such as an imposition engine, a buffer manager, a decomposer, a marker, a print engine and other components for implementing the current disclosure. Functionality of each component is well known in the art but in the context of the current disclosure, these components work in tandem with each other such that spot color is applied on specific pages of a print job as specified by a user. In all, the multi-function device is configured for applying spot color on one or more pages as specified by a user in the context of the current disclosure.

The term "user interface" enables a user to access the printer or functionality related to the printer. In the context current disclosure, the user interface is configured to provide an option to the user to provide one or more pages where spot color is to be applied.

The term "print job" is a job submitted by the user in the form of a page description language (PDL) document such as PostScript (PS), Portable Document Format (PDF) and Extensible Markup Language (XML) Paper Specification (XPS). The print job includes a document having multiple pages. Each page is associated with a page number or may have any other page identifier.

"Print Server" is defined to include an application, a program, or a combination thereof that runs on the printer to achieve the desired function of applying clear colorant on one or more pages as specified by the user. For example, the print server is FreeFlow Print Server.

The term "imposition" refers to the process of arranging multiple pages of the print job or the document on one side of a single sheet for printing. For example, if a user wants to print a four pager document on a single sheet (e.g., A4 size) of paper, the 4 pages are arranged in the form of four logical pages or four cells on the single A4 size sheet of paper. Further, each page arranged on the single sheet is known a logical page. In other words, imposition is the process of combining logical pages to form a physical page, a simple example of imposition is 2-up printing, in which two logical pages are printed side by side on the same sheet.

The term "logical page" refers to a page having information after cutting, and/or binding operation. While a "physical page" contains one or more logical pages that appears on one side of a sheet.

Normal printing mode is the CMYK (Cyan Magenta Yellow Black) color mode for printing, wherein CMYK indicate different color toners.

The term "spot color" refers to a glossy or shiny finish given to a specific logical page as specified by the user at the time of printing. The shiny finish may be obtained by the use of a clear colorant, also referred to as the "Clear Dry-Ink." The spot color may interchangeably be used with clear, clear colorant, finishing styles, glossy look, transparent color, or spark color. The spot color is generally used in the printing industry to achieve very vibrant colors that are beyond the available CMYK color.

Overview

With the existing solutions, if a document is printed with imposition, and then clear colorant is applied, then by default the clear colorant is applied to all pages of the document. To overcome this, the disclosure discloses methods and systems facilitating clear colorant application while documents in imposition. The primary aim of the disclosure is to provide an adaptive technique for applying clear colorant only to one or more pages as specified by a user instead of all pages of a document in imposition. An option is provided to the user at the job level for specifying those one or more pages where he or she wishes to apply the clear colorant.

EXEMPLARY EMBODIMENTS

FIG. 1A illustrates an exemplary environment 100 in which various embodiments of the disclosure can be practiced. The environment 100 includes a printer 102 and a user 104. The user 104 typically accesses the printer 102 for printing or related functionalities. In the context of the current disclosure, the user 104 submits a print job for printing with spot color option. The user 104 submits the print job using a computing device (although not shown) such as a computer, a laptop, a tablet, a mobile device or any handheld device. And the printer 102 prints the job as submitted by the user. To this end, the printer 102 contains four ink stations, one each for four colors, cyan (C), magenta (M), yellow (Y) and black (K). Any document can be printed in any color using ink from the four ink stations CMYK. This is called the normal color printing mode of the printer 102. If the user 104 wants to use the fifth colorant, i.e., the clear colorant, then this is called printing with CMYK and Clear. The clear colorant is a special type of colorant, which is generally contained in a separate ink station of the printer 102. The job is printed on a print media. Various examples of the print media can be a physical sheet of paper, plastic, or other suitable physical print media substrate for carrying images.

The print job includes a document having multiple pages. The document is a soft copy having one or more objects such as image, graphics, text or a combination thereof. Few examples of the print job include, but not limited to, a booklet, a brochure, a pamphlet and the like. The document is a page description language (PDL) supported document but other suitable formats may be implemented for the current disclosure. Few examples of the PDL supported formats may include doc, docx, ppt, pptx, or any other formats supported by PDL files. One such popular format is a PDF format, however any other existing or later developed PDL supported formats can be implemented. The document further may include information about fonts, graphics, and the like that describe the appearance of data, which is to be printed, present within the print job. The document may include a set of programming language commands for processing the document based on the information within the document. In other words, the PDL is a computer language that describes the appearance of a printed page in a higher level than an actual output bitmap.

In the context of the current disclosure, the printer 102 provides a user interface enabling the user 104 to use clear functionality without having programming knowledge. The user interface allows the user to specify one or more pages to be printed with clear functionality. The printer 102 receives the command, interprets the command and applies the clear functionality on the specified pages. Before applying the clear functionality, the printer 102 applies imposition to the print job as specified by the user. Finally, the printer 102 prints the specified pages with a glossy look or shine look. The options for printing using CMYK, or CMYK and Clear can be specified by the user 104 using the document's print properties, which may be accessed via the user interface. More details will be discussed in following figures.

For simplicity, the disclosure is discussed with a single user submitting a print job to the printer 102. However, it is understood that multiple job requests from a single user or multiple users may be submitted to the printer 102 for processing. One such example is shown in another exemplary environment 110 of FIG. 1B, where one or more users such as users 104a, 104b, and 104c submit print jobs to the printer 102 via respective computing devices (not shown). The submitted print jobs are processed by the printer 102 in the same manner as a single print job discussed above.

Figure 2A:
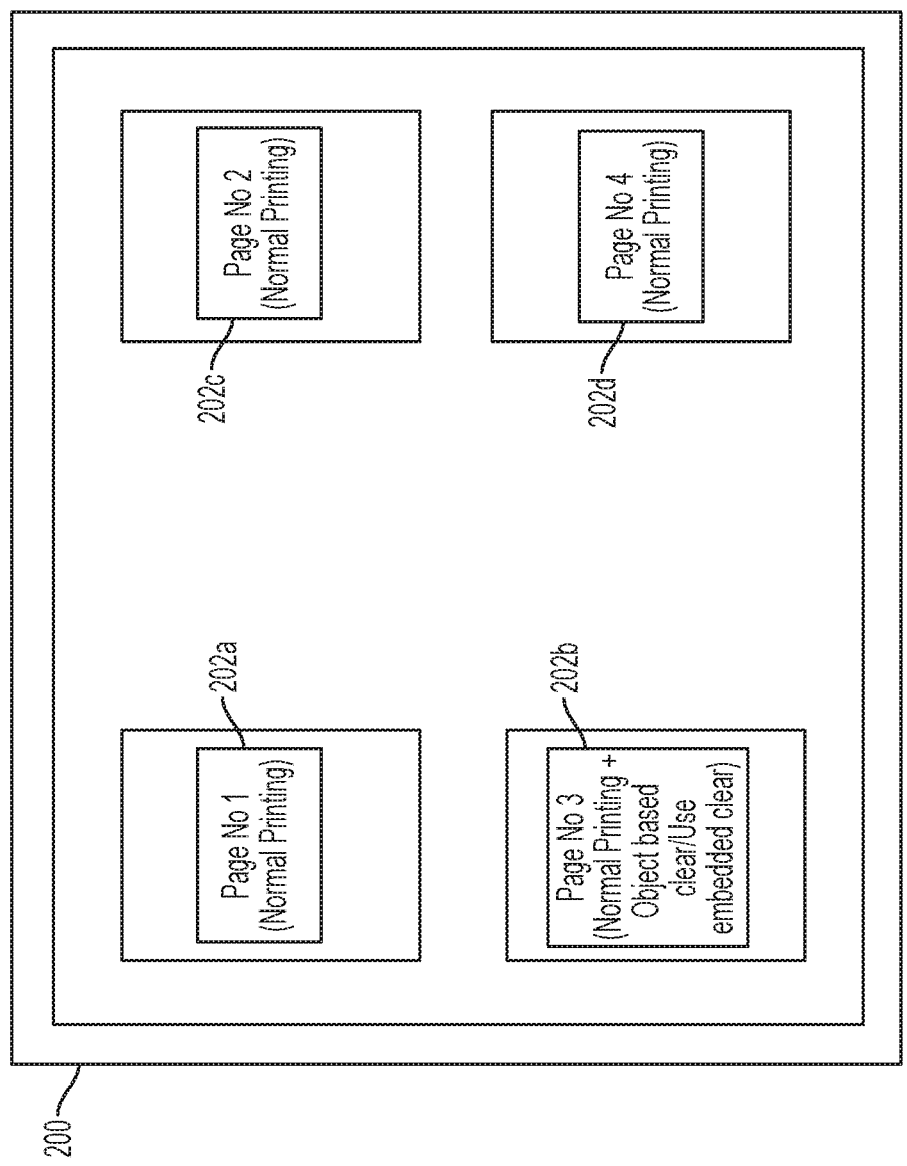
FIGS. 2A-2B illustrate outputs generated as per current disclosure and as per state of the art, respectively.
Figure 2B:
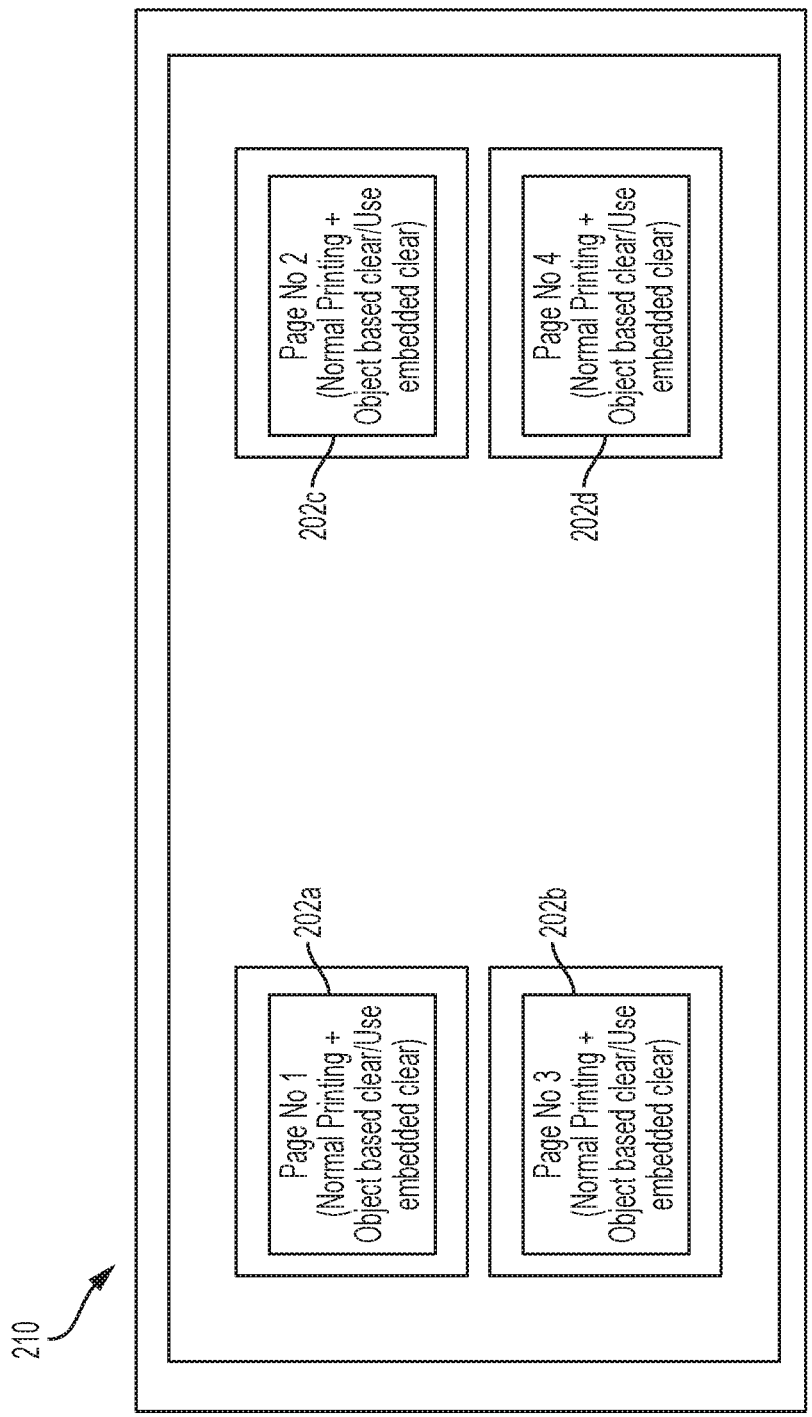

To further explain the disclosure, an example is discussed. In the example, it is considered that a document having four pages is submitted by the user. Each page may include text, image, graphics or a combination thereof. It can be considered that the user wishes to apply clear only on page 3 and wishes to have the 4 pages on an output media, i.e., a single sheet of a physical paper. So here, the imposition is applied where each page of the print job is imposed on the single sheet of the paper and each imposed page on the sheet of paper (printable sheet) is called as a logical page or a logical cell. Each logical page corresponds to an original page of the document. The logical page corresponding to the original page is identified and the clear colorant is applied on a specific logical page. The output generated after implementing the current disclosure is shown in FIG. 2A, where a single output sheet 200 is shown. As shown, the output sheet 200 includes 4 logical pages as 202a, 202b, 202c, and 202d. Each of the logical pages 202a-202d include objects (although not shown) in the form of text, image or graphics. At the time of printing, the user 102 specifies that he wishes to print the page 3, i.e., the logical page 202c with clear functionality. In such cases, the printer 102 analyzes the command and prints the logical page 202c with clear functionality. When compared with the known or state of the art solutions, the existing solutions when receive command for clear functionality, by default the clear functionality is applied to all logical pages as shown in FIG. 2B. Meaning that the clear functionality is applied to all the logical pages, i.e., to 202a, 202b, 202c, and 202d.

Figure 3A:
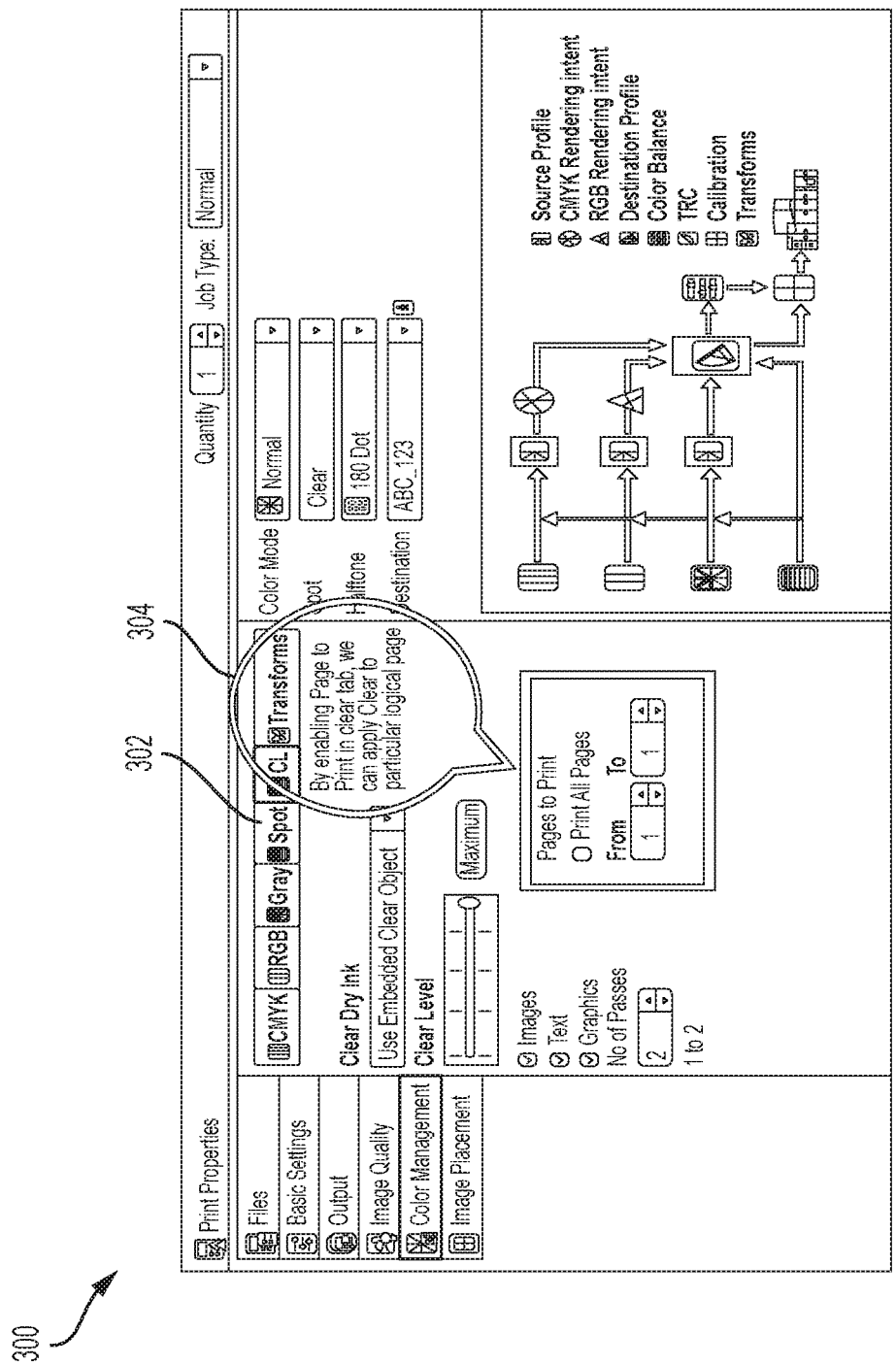
FIGS. 3A-3B illustrate user interface snapshots as per current disclosure and as per state of the art, respectively.
Figure 3B:
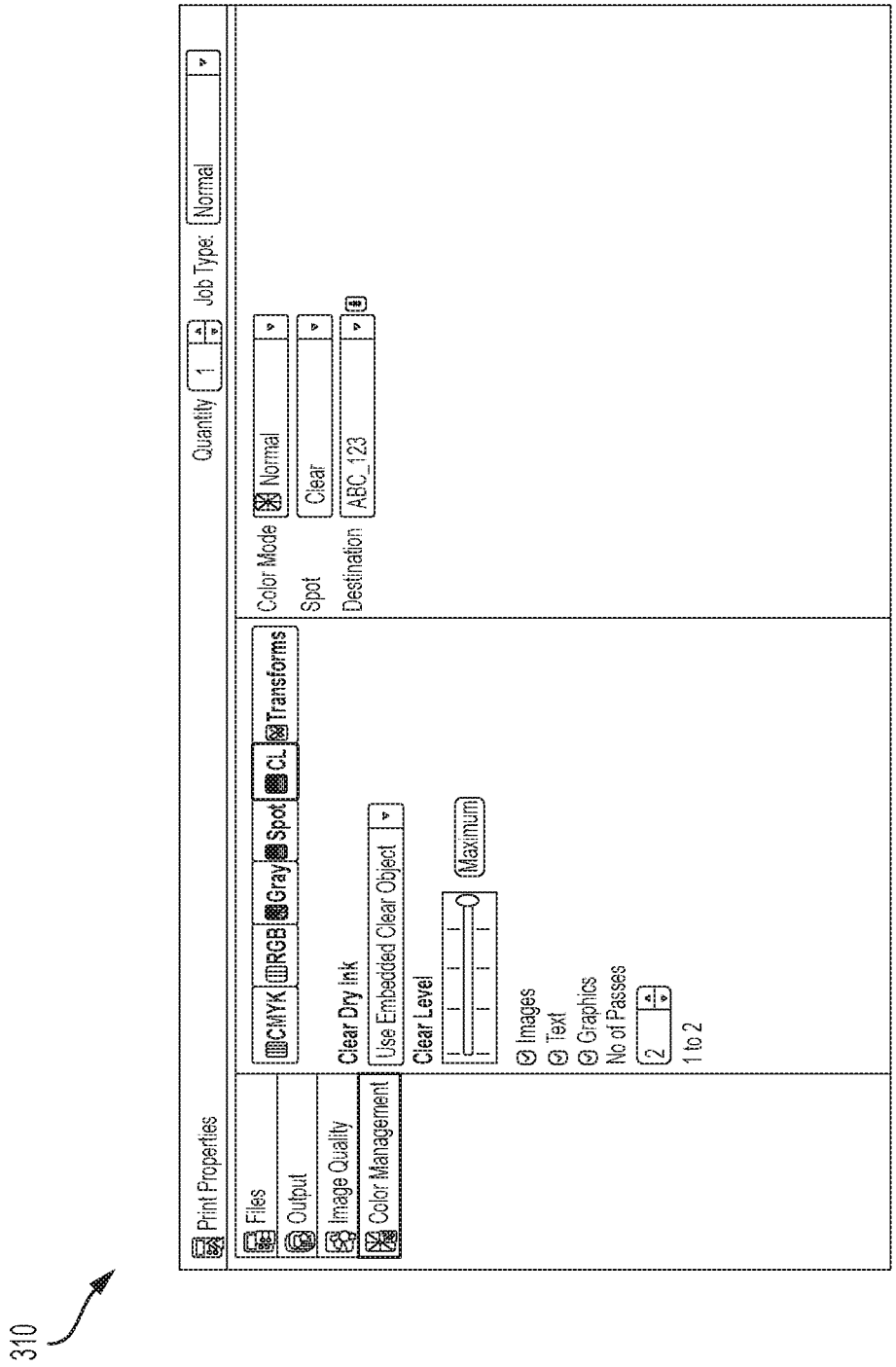

FIG. 3A shows an exemplary user interface 300 as per the current disclosure. The user interface 300 provides a spot color option indicated as 302 and further provides an option indicated by 304 to enter specific pages to be printed with clear colorant at the job level. For example, the user 102 can select page numbers to be printed, such as page number 1, as shown. However, a user interface 310 of the existing solutions is shown in the FIG. 3B, wherein the option of providing specific pages to be printed with clear functionality is not available in the user interface 310.

In addition to the clear functionality, the user interface 300 of the current disclosure enables the user 102 to select an imposition template for arranging the plurality of pages of the submitted print job into logical pages in accordance with the selected imposition template. The user interface 300 enables the user 102 to preview the logical page arrangement obtained as a result of applying imposition.

For a person skilled in the art, it is understood that the imposition techniques, raster image processing, printing techniques are known and thus, detailed discussion on these is not required. In context of the present disclosure, the user interface 300 allows the user to provide the specific page numbers where clear colorant is to be applied, while the documents in imposition. The printer 102 is configured to apply clear colorant only to those specific pages.

The disclosure address the problem where the user wishes to have clear applied on specific pages of a document instead of all pages without implementing or executing exception programming or without having programming knowledge.

Figure 4:
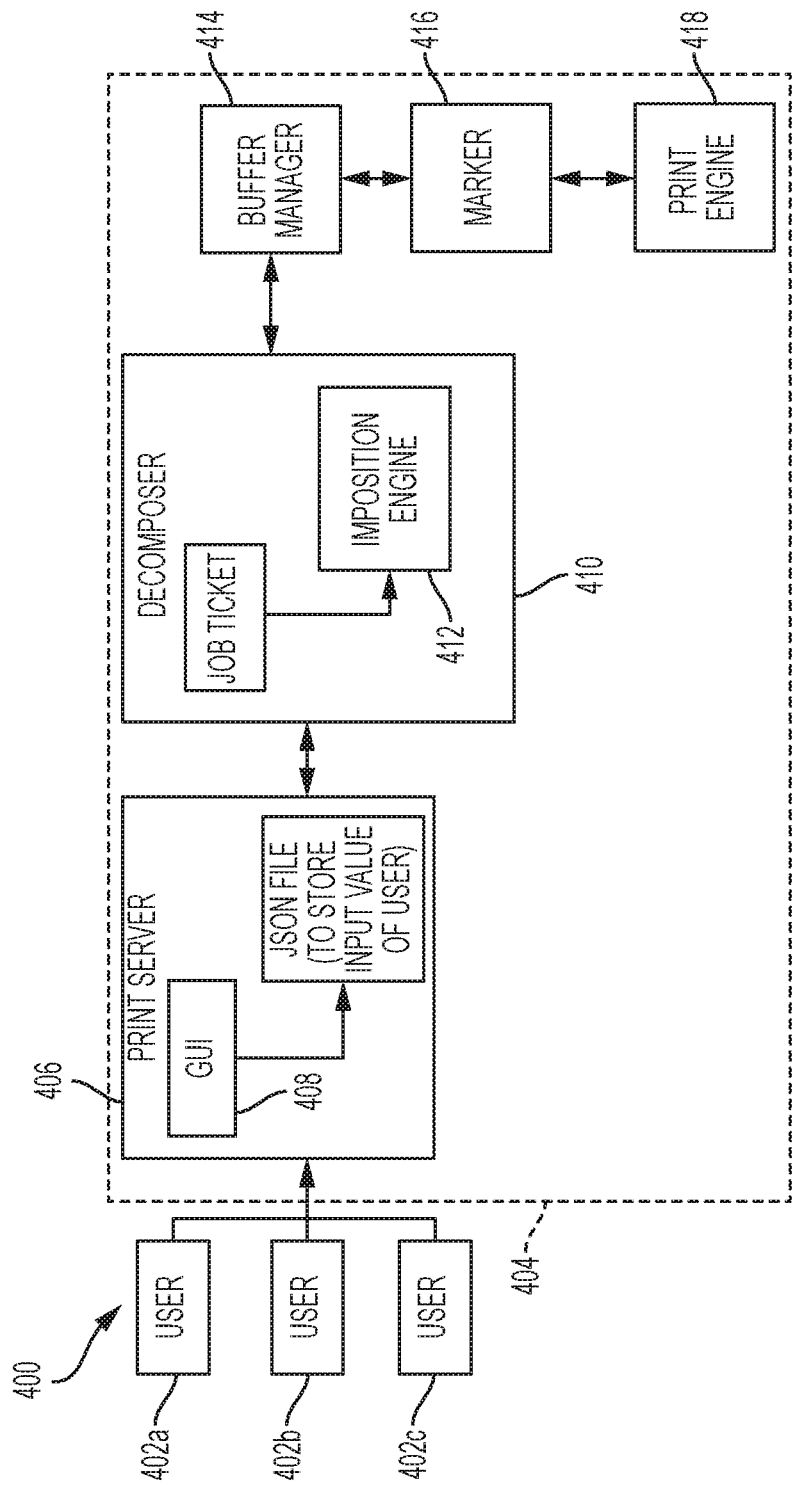
FIG. 4 shows an exemplary system for applying clear colorant on one or more pages as specified by a user.

FIG. 4 shows an exemplary overall system 400 for applying clear colorant on pages as specified by a user, according to an aspect of the disclosure. The system 400 includes a printer 404 having a print server 406 in the form of a FreeFlow Print Server application 406, a Graphical User Interface (GUI) 408 or user interface 408, a raster image processor 410 or a decomposer 410 (hereinafter referred to as decomposer), an imposition engine 412, a buffer manager 414, a marker 416 and a print engine 418. Each of the components 406, 408, 410, 412, 414, 416, 418 communicate with each other via suitable known protocols or later developed protocols. The application 406, the GUI 408, the decomposer 410, the imposition engine 412, the buffer manager 414, and the marker 416 may be implemented in the form of software module, while the print engine 418 may be in the form of a hardware. As shown, one or more users such as 402a, 402b, 402c (collectively 402) are connected to the printer 404 via a network such as a wired or a wireless network.

The one or more users 402 submit print jobs from their respective computing devices (although not shown) to the printer 404. Various examples of computing devices include but not limited to, mobile devices, laptops, personal computers, tablets, or the like. The print jobs submitted by the users 402 are of formats page description languages (PDLs) such as PostScript or HP-PCL and their respective variants as well as other formats such as TIFF or ASCII.

The printer 404 includes a receiving module (not shown) for receiving the submitted print jobs from the users 402 through network. Further, the jobs are passed on to the print application 406 for further processing. For simplicity, reference to a single print job will be made without limiting the scope of the disclosure. The print job is received in the form of at least two portions: the document containing data to be printed in the PDL supported format or any other desired format and a job description including one or more instructions for printing the job. The job description may include, for example, how many copies of the print, size, color of paper, whether the prints are to be duplexed, collated, stapled, imposition, or otherwise finished, etc. The job description may be embedded within the document. While the job description may be kept separate from the print job and may be a part of a job ticket. In some embodiments, the job description may be provided by the user 402 via the GUI 408. For example, the user 402 may provide imposition related information, clear colorant attributes, or a combination thereof.

The GUI 408 receives clear colorant attributes from the user 402, the clear colorant attributes include type of clear colorant and one or more pages where clear is to be applied. The GUI 408 allows the user 402 to provide clear colorant attributes or properties after submitting the print job. The clear attributes include type of clear colorant and one or more pages where clear is to be applied. For example, an option is enabled in the GUI 408 to provide one or more page numbers for applying clear colorant. The output of specifying the page number in the user interface 300 at the time of selecting clear option is that only the specified pages appears with the effects of clear colorant, and remaining pages in the imposition are printed with normal CMYK color mode.

Various types of clear colorant include embedded clear colorant, object based clear colorant and suppress clear colorant. The embedded clear colorant option allows the user 402 to specify clear colorant attributes within the print job and in such cases no additional attributes or inputs are needed from the user 402. The attributes are provided at the programming level. In object based clear colorant, the PDL document is submitted without any attributes and the user 402 selects any object from the PDL document where he or she wishes to apply clear colorant. The clear colorant can be applied to text, graphics or images. The selection is done via the user interface 408. Suppress clear option is opposite to the object based clear colorant. Here, the user 402 provides the input in terms of which object he or she wishes to suppress and the clear colorant is automatically applied to the remaining objects. For example, if the user 402 selects image as the object to be suppressed, in that case clear colorant is applied only to text and graphics and no clear colorant is applied to the image object.

Along with this, the GUI 408 receives an imposition type to be applied on the document from the user 402. The user 402 may provide information about the type of imposition by selecting the type of imposition from the multiple imposition template options as available in the GUI 408. Various imposition templates may be Cut Stack, N-Up Consecutive, Sequential, Perfect Binding, 8-Up Booklet, Sheet Wise style, Interleave, Replicate/Step and Repeat, 2-Up Perfect Bound, 2-Up Saddle Stitch, N-Up (4×6), Booklet, Multiple Booklet, Signature, or any custom imposition templates.

As mentioned, the print job, clear colorant attributes and imposition information are received by the print server 406. The information provided by the user 402 using the GUI 408 in converted and stored in the form of a standard file format, such as the JavaScript Object Notation (JSON) file. The JSON file stores the job related information (the print job, clear colorant attributes and imposition information), which is further passed to the decomposer 410.

The decomposer 410 receives the print job, the clear colorant attributes and imposition related information. The decomposer 410 converts the received information into a print ready format or rasterized data (image data). The print ready format is the pixel-based representation of the page suitable for delivery to print heads of the print engine 418. The decomposer 410 creates a job ticket for processing the job by the decomposer 410. The job ticket is used by other modules such as the imposition engine 412, the buffer manager 414, and the marker 416 for easy identification and retrieval of the print job.

Few examples of the decomposer 410 which are commercially available include, but not limited to, PCL decomposers, PDL decomposers which are responsible for interpreting PCL documents, PDL documents, respectively. The decomposer 410 receives the job description and interprets the job description. In particular, the decomposer 410 decomposes the job description to produce corresponding bitmapped image file. In some cases, the decomposer 410 receives the resolved print job from a job chooser and processes the received data to produce print ready data (which may be binary or any other form of data) that is supplied to the buffer manager 414. The decomposer 410 may include one or more interpreters for analyzing page description language files. Various examples include, but not limited to, a PostScript interpreter, a TIFF interpreter, a PDF interpreter, a PCL interpreter or the like.

The decomposer 410 passes the print job and the imposition related information to the imposition engine 412. The imposition engine 412 receives the print job and the imposition related information. Based on the imposition information, the imposition engine 412 determines the number of pages of the plurality of pages to be arranged on a single sheet of an output media such as a sheet of paper. The pages to be arranged on the single sheet of the output media are logical pages. Each logical page is assigned with a logical page identifier. Based on the determination, at least two logical pages are arranged on one side of the single sheet. The imposition engine 412 associates each logical page with the corresponding original page of the print job. Specifically, the imposition engine 412 associates the logical page identifier with the page number of the print job. For example, if the user 402 specifies an imposition template as 2×2. Accordingly, the imposition engine 412 interprets the given instructions and divide the single page into two rows and two columns such that each single page may be partitioned into four logical pages. Each logical page is identified by a specific identifier such as a page number or any other type of identifier may be implemented. The imposition engine 412 passes the re-arranged pages to the decomposer 410 for further processing along with the job description. The decomposer 410 then interprets the information and direct the marker 416 to control the print engine 418 such that clear colorant is applied only on the pages as specified by the user 402.

The buffer manager 414 stores the different jobs related data and passes the data to the marker 416 sequentially. The buffer manager 414 receives the decomposed data from the decomposer 410 and hold the data until the marker 416 is ready for processing them (i.e., for immediate submission to the print engine 418). The data or page images from the decomposer 410 are retained in the buffer manager 414 until requested by the marker 416 which controls the printer hardware, i.e., the print engine 418. The buffer manager 414 records each page image in the buffer. When the marker 416 requests a particular set of page images for printing, the buffer manager 414 retrieves the necessary page images from recorded locations in the buffer.

Based on the image data as received from the buffer manager 414, the marker 416 sends the data to the print engine 418 for generating the output document on suitable media such as large paper sheets. In this manner, the print engine 418 outputs the printed sheets, where clear colorant is applied only on the pages as specified by the user 402. The print engine 418 includes a clear colorant applying component for applying clear colorant to the specified pages. The clear spot colorant feature adds layers of clear colorant over top of CMYK mode text, graphics and images to give them a textured appearance, or look as if they are three dimensional. This is a very unique effect that can be achieved on output only by layering the clear colorant on the printed page, clear is applied on top after applying CMYK.

For a person skilled in the art it is understood that the decomposer 410 decomposes the plurality of pages into image data that is understood by other modules 412, 414, 416 and 418. And these modules 412, 414, 416 and 418 use the image data of the pages for further processing. For example, the imposition engine 412 re-arranges the image data corresponding to the plurality of pages. The buffer manager 414 stores the image data of the plurality of pages and stores the re-arranged image data corresponding to the plurality of pages. And the print engine 418 applies clear colorant on image data corresponding to the one or more pages as specified by the user 402. The print engine 418 prints the image data corresponding to the one or more pages as specified by the user with clear colorant. In this manner, the print is generated including the one or more pages with clear colorant and remaining pages in CMYK mode.

For a person skilled in the art, it is understood that job is submitted from a single user, however, jobs may be submitted from any numbers of users or computers connected over a network.

In some embodiments, the system 400 may be implemented in the form of a digital front end module (DFE) and digital rear end module (DRE). These modules (although not shown) may include a special purpose processor that is specialized for processing image data and includes a dedicated processor that is specialized for the handling of image processing operations, processing image data, calculating pixel values, etc.

Figure 5:
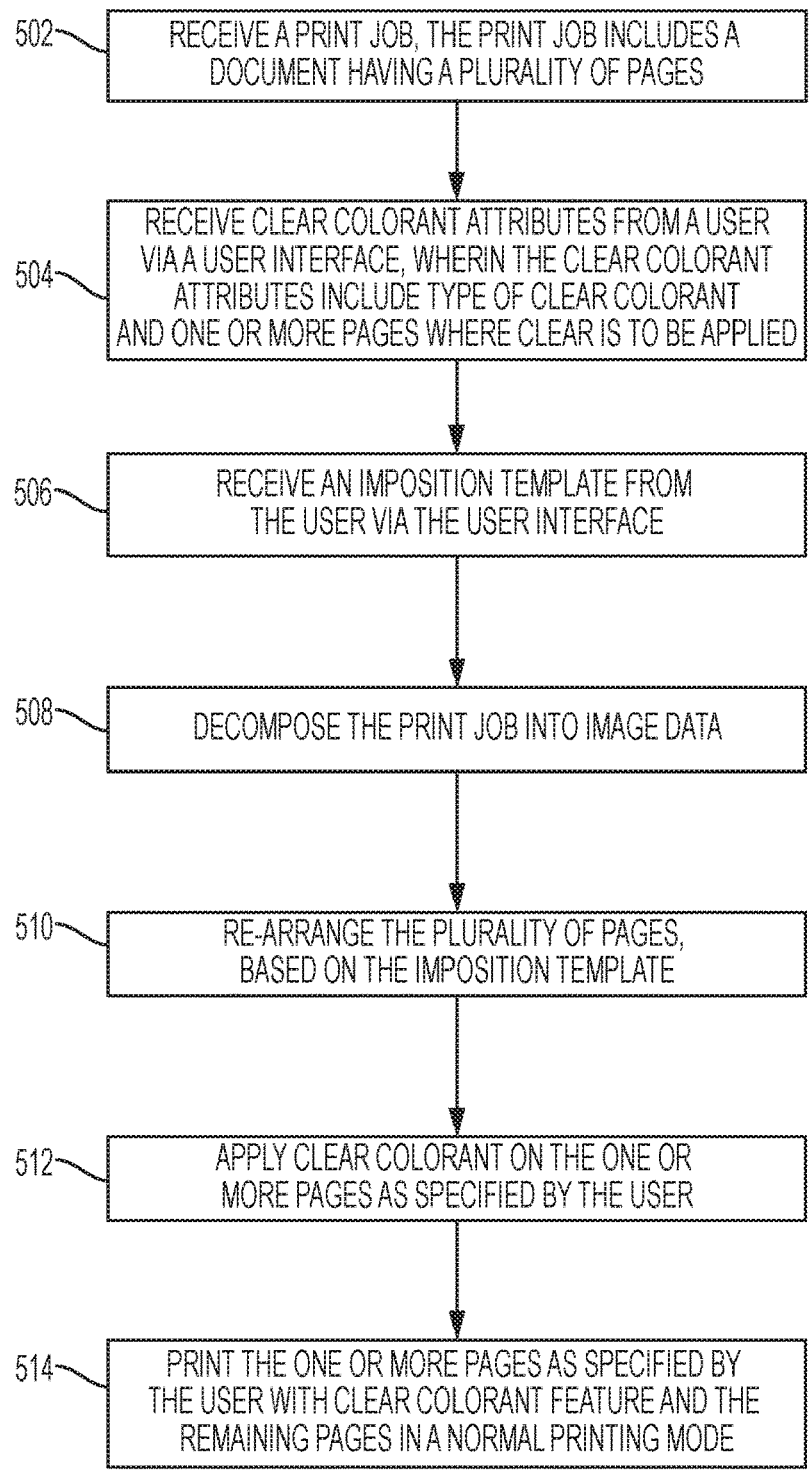
FIG. 5 is a method flowchart for applying clear colorant on one or more pages as specified by a user.

FIG. 5 illustrates a method for printing one or more logical pages of a document with clear colorant. At 502, a print job is received from a user. The print job includes a document having multiple pages. The print job is submitted by the user via an application such as Adobe InDesign Software or PDL running on a computing device of the user. The print job is received in a job queue at a multi-function device or a print server application. The print job is converted into JSON format. At 504, clear colorant attributes are received via a user interface of the multi-function device. The attributes include type of clear colorant and one or more pages where clear is to be applied. Various types of the clear colorant include embedded clear, suppress clear, and an object based clear or a combination thereof. Then, at 506, type of imposition is received from the user via the user interface. The type of imposition may include imposition template, or may include various imposition parameters such as number of pages to be imposed on a single sheet, number of rows and column, page layout, or any other imposition related parameters.

At 508, the print job is decomposed into image data. Along with the print job, the clear colorant attributes and imposition related information may be translated into print ready format. A job ticket is created for the print job such that print job is further processed. At 510, the plurality of pages is re-arranged based on the imposition information. The re-arranging includes determining the number of pages to be arranged on a single sheet of an output media. It includes at least two pages of the print job to be arranged on the single sheet of the output media. The at least two pages are the logical pages. Each logical page is assigned with a logical identifier. Further, each logical page is associated with the original page of the print job. In particular, the logical page identifier is associated with the page number of the print job.

The re-arranged plurality of pages is stored and processed further to identify one or more logical pages corresponding to the one or more pages as specified by the user. Based on the association between the original pages and the logical pages, the one or more logical pages and corresponding logical page identifiers are identified.

Thereafter, at 512, clear colorant on the one or more pages as specified by the user is applied. Here, clear colorant is applied to one or more logical pages corresponding to the one or more pages as specified by the user. At 514, the one or more pages as specified by the user are printed with clear colorant feature and the remaining pages are printed in a normal printing mode. Meaning that the logical pages corresponding to the one or more pages as specified by the user are printed with clear colorant feature and remaining logical pages are printed in a normal CMYK mode. In this manner, the method allows the user to have clear applied to specific pages or logical pages as per the requirements with ease.

The disclosure may be implemented for any types of documents such as business cards, magazines, flyers, brochures, books, manuals, cards, c-fold brochures, postcards, newsletters, special event programs, calendars, pamphlets and the like. These are just few examples without limiting the scope of the disclosure.

The present disclosure describes methods and systems for applying clear colorant to specific pages as specified by a user. To this end, the disclosure provides a user interface enabling the user to specify one or more pages where clear is to be applied. The functionality provided in the user interface even enables a user with less programming knowledge to use the feature specifying pages for clear colorant application, making it advantageous for a large user base. Additionally, the methods and systems are very efficient as clear colorant is applied only to pages as specified by the user, thereby, helps saving a huge amount of toner.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating," or "monitoring," or "displaying," or "tracking," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A printer, comprising:
   a receiving module for receiving a print job, the print job comprises a document having a plurality of pages, each page is associated with a page number;
   a user interface for:
   receiving clear colorant attributes from a user at a job level, wherein the clear colorant attributes comprise an embedded clear colorant, an object based clear colorant and a suppress clear colorant and one or more page numbers corresponding to one or more pages, where clear is to be applied;
   receiving an imposition type to be applied on the document, from the user;
   a decomposer for:
   receiving the clear colorant attributes and the imposition type;
   decomposing the plurality of pages into image data; and creating a job ticket for processing the print job having the plurality of pages, by other modules; an imposition engine for re-arranging the image data corresponding to the plurality of pages, based on the imposition type;

a buffer manager for storing the re-arranged image data corresponding to the plurality of pages; and a print engine for:
selectively, applying clear colorant on image data corresponding to the one or more pages as specified by the user; and
printing the image data corresponding to the one or more pages as specified by the user with clear colorant.

2. The printer of claim 1, wherein the imposition engine is for:
based on the imposition type, determining the number of pages of the plurality of pages to be arranged on a single sheet of an output media;
arranging two or more logical pages to be printed on the single sheet of the output media, wherein each logical page is assigned with a logical page identifier; and
associating the logical page identifier with each page number of the print job.

3. The printer of claim 1, wherein the document is a Page Description Language (PDL) supported document.

4. The printer of claim 1, wherein the received print job is converted into a Java Script Object Notation (JSON).

5. The printer of claim 1, wherein one or more print jobs are received by the receiving module.

6. The printer of claim 1, wherein the clear colorant attributes are included in the print job.

7. A method, comprising:
receiving a print job, the print job includes a document having a plurality of pages;
receiving clear colorant attributes at a job level from a user via a user interface, wherein the clear colorant attributes include an embedded clear colorant, object based clear colorant and suppress clear colorant and one or more pages where clear is to be applied;
receiving an imposition template from the user via the user interface;
decomposing the print job into image data;
creating a job ticket for processing the print job;
re-arranging the plurality of pages, based on the imposition template;
storing the re-arranged pages; applying clear colorant on the one or more pages as specified by the user; and
printing the one or more pages as specified by the user with a clear colorant feature and the remaining pages in a normal printing mode.

8. The method of claim 7, wherein the input document is a PDL supported document.

9. The method of claim 7, wherein the received job is converted into a Java Script Object Notation (JSON).

10. The method of claim 7, further comprising receiving one or more print jobs.

11. The method of claim 7, wherein the clear colorant attributes are included in the document if the type of clear colorant is embedded clear.

12. The method of claim 7, further comprising applying clear colorant on at least one of: an object, an image and a graphic, if the type of clear colorant is object based clear.

13. The method of claim 7, wherein the user specifies one or more page numbers corresponding to the one or more pages, where clear colorant is to be applied.

14. The method of claim 7, wherein applying imposition comprises rearranging the plurality of pages of the document before printing.

15. A method for selectively applying clear colorant on one or more pages of a print job, the method comprising:
receiving the print job, wherein the print job includes a document having a plurality of pages;
receiving clear colorant attributes from a user at a job level, wherein the clear colorant attributes include an embedded clear colorant, object based clear colorant and suppress clear colorant and one or more pages where clear is to be applied, wherein the type of clear colorant includes;
receiving an imposition type from the user;
decomposing the print job into a print ready format;
creating a job ticket for processing the print job;
based on the imposition type, re-arranging the plurality of pages, wherein the re-arranging comprises: determining the number of pages to be arranged on a single sheet of an output media;
arranging two or more logical pages to be printed on the single sheet of the output media, wherein each logical page is assigned with a logical page identifier; and
associating each logical page with original page of the print job;
storing the re-arranged plurality of pages;
applying the clear colorant on one or more logical pages corresponding to the one or more pages as specified by the user; and
printing the one or more logical pages corresponding to the one or more pages as specified by the user with a clear colorant feature and the remaining logical pages are printed with normal CMYK (Cyan, Magenta, Yellow and Key) mode.

16. The method of claim 15, wherein the clear colorant attributes are included in the document if the type of clear colorant is embedded clear.

17. The method of claim 15, further comprising applying clear colorant on at least one of an object, an image, and a graphic, if the type of clear colorant is object based clear.

* * * * *